(12) United States Patent
Zhao et al.

(10) Patent No.: US 8,463,142 B2
(45) Date of Patent: Jun. 11, 2013

(54) METHOD, APPARATUS, AND SYSTEM FOR FEEDBACK CONTROL OF COHERENT RECEIVER

(75) Inventors: Chan Zhao, Shenzhen (CN); Wentong Wan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 103 days.

(21) Appl. No.: 13/294,734

(22) Filed: Nov. 11, 2011

(65) Prior Publication Data

US 2012/0057884 A1    Mar. 8, 2012

Related U.S. Application Data

(63) Continuation of application No. PCT/CN2010/070184, filed on Jan. 14, 2010.

(30) Foreign Application Priority Data

May 14, 2009    (CN) .......................... 2009 1 0084418

(51) Int. Cl.
*H04B 10/06* (2006.01)
(52) U.S. Cl.
USPC ........................... 398/204; 398/209; 398/210
(58) Field of Classification Search
USPC ......................................... 398/204, 209–210
See application file for complete search history.

(56) References Cited

U.S. PATENT DOCUMENTS

| | | | |
|---|---|---|---|
| 6,522,459 B1 | 2/2003 | Pease et al. | |
| 2007/0201568 A1 | 8/2007 | Bae et al. | |
| 2008/0038001 A1 | 2/2008 | Becker et al. | |
| 2012/0021699 A1* | 1/2012 | Mikhemar et al. | ............. 455/75 |

FOREIGN PATENT DOCUMENTS

| | | |
|---|---|---|
| CN | 101099315 A | 1/2008 |
| CN | 101127568 A | 2/2008 |
| WO | WO 2007/120403 A2 | 10/2007 |

OTHER PUBLICATIONS

Written Opinion of the International Searching Authority issued in corresponding PCT Patent Application No. PCT/CN2010/070184, mailed Apr. 22, 2010.
International Search report issued in corresponding PCT Patent Application No. PCT/CN2010/070184, mailed Apr. 22, 2010.
Search Report issued in corresponding Chinese Patent Application No. 200910084418.4, dated Feb. 26, 2013.
Supplementary European Search Report issued in corresponding European Patent Application No. 10 77 4499; dated Jul. 3, 2012.

* cited by examiner

*Primary Examiner* — Leslie Pascal
(74) *Attorney, Agent, or Firm* — Brinks Hofer Gilson & Lione

(57) ABSTRACT

A method, an apparatus, and a system for feedback control of a coherent receiver are provided. The method for feedback control of the coherent receiver includes: obtaining a feedback control quantity according to a digital signal converted by an Analog-to-Digital Converter (ADC); and adjusting a signal amplitude output by a Transimpedance Amplifier (TIA) and a direct current component of an offset T device according to the feedback control quantity, until an analog signal input into the ADC is in a sampling range of the ADC, where the TIA is serially connected to the offset T device and then is connected to the ADC. Present invention has the following advantages: enabling the analog signal to adapt to the ADC sampling best, maximizing an effective information quantity sampled by the ADC and better supporting subsequent processing of a Digital Signal Processing (DSP) unit, thereby improving a coherent receiving performance.

14 Claims, 4 Drawing Sheets

US 8,463,142 B2

METHOD, APPARATUS, AND SYSTEM FOR FEEDBACK CONTROL OF COHERENT RECEIVER

CROSS-REFERENCE TO RELATED APPLICATIONS

This application is a continuation of International Application No. PCT/CN2010/070184, filed on Jan. 14, 2010, which claims priority to Chinese Patent Application No. 200910084418.4, filed on May 14, 2009, both of which are hereby incorporated by reference in their entireties.

FIELD OF THE APPLICATION

The present application relates to communication technologies, and in particular, to a method, an apparatus, and a system for feedback control of a coherent receiver.

BACKGROUND OF THE APPLICATION

With development of high speed optical communication technology, people's demands for various services are also growing. For example, the growing demands for information capacity of a single channel in optical communication make the rate of a single wave of the Dense Wavelength-Division Multiplexing (DWDM) system develop from 10 Gbps to 40 Gbps. Currently, the 100 Gbps single wave technology has already appeared and is in constant improvement.

The coherent electric processing method is currently acknowledged as a relatively ideal receiving method for a system with a single-wave rate of 100 Gbps. In the coherent electric processing method, it is necessary to perform a coherent electric processing algorithm after a digital-to-analog conversion, so as to complete demodulation of data information sent by a transmitter. The key point of the coherent electric processing is the correctness of data of an analog-to-digital conversion and a Digital Signal Processing (DSP) algorithm. In order to provide an optimal electric signal data for the DSP algorithm, the information quantity of the analog data sampled by an Analog-to-Digital Converter (ADC) directly determines the demodulation performance of the entire receiving apparatus.

The model of major parts of a coherent receiver disclosed in the prior art is as shown in FIG. 1. Major characteristics of a coherent receiver are as follows. A 90-degree optical frequency mixer is used to perform the coherent frequency mixing of signal lights and local laser lights, where an output wavelength and a power of a local laser are adjusted by a corresponding driver; two quadrature polarization signal lights are output after a signal enters a polarization beam splitter, which are respectively sent to the 90-degree optical frequency mixers together with the beam-split local laser lights at the same time; the optical frequency mixers output four groups of differential signal lights; after the optical-to-electric conversion is performed on each group of differential lights by using a balanced detector, each signal obtained by optical-to-electric conversion goes through a transimpedance amplifier (TIA) for linear amplification of the signal, and finally enters the ADC, which converts analog electric signals into digital signals and sends the digital signals into a subsequent DSP unit for relevant processing and demodulation of information of the signal lights. In the prior art, the disclosed feedback control method has the following principle.

In a feedback control, after modulated signal lights are input into a signal light processor, the frequency mixing of the signal lights and the local laser lights is performed by an adjustable optical coupler; after coupling of the coupler, dual-ended optical signals enter the balanced detector to complete the O/E conversion; a Radio Frequency (RF) signal processor calculates a feedback quantity for the converted RF signals and outputs the feedback quantity to various executing devices, such as a frequency phase locker, an RF peak detector, and an automatic scanning circuit; and the adjustable optical devices or the local laser is optically adjusted by the executing devices on the circuit. The RF signals through the closed loop control are the received electric signals required after certain kind of processing. In other feedback methods, a feedback of relevant control parameters is given by the DSP unit to adjust the output frequency of the laser, so as to minimize the deviation between the output frequency of the local laser and the frequency of the signal lights.

It can be known that in feedback control in the prior art, devices such as adjustable optical devices and electrical RF processors are used; two kinds of feedback loops, an optical path and a circuit RF signal, work at the same time; only the output RF signals are processed, and accordingly a feedback thereof is given. The DSP unit only feeds back frequency control signals to the local laser.

During the implementation of the disclosed embodiments, the inventors find that the prior art has some defects, for example, the influence of the ADC on the coherent electric processing algorithm is not taken into consideration in the feedback control.

SUMMARY OF THE APPLICATION

The present application provides a method, an apparatus, and a system for feedback control of a coherent receiver, for adjusting an analog signal before ADC sampling and making the analog signal adapt to the ADC sampling best, maximizing an effective information quantity sampled by the ADC and better supporting subsequent processing of a DSP unit, and thereby improving a coherent receiving performance.

An embodiment of the present application provides a method for feedback control of a coherent receiver, where the method includes:

obtaining a feedback control quantity according to a digital signal converted by an ADC; and adjusting, according to the feedback control quantity, a signal amplitude output by a TIA and a direct current component of an offset T device, until an analog signal that enters the ADC is in a sampling range of the ADC, where the TIA is serially connected to the offset T device and then is connected to the ADC.

An embodiment of the present application provides an apparatus for feedback control of a coherent receiver, where the apparatus includes:

an obtaining module, configured to obtain a feedback control quantity according to a received digital signal converted by an ADC; and an adjusting module, configured to adjust, according to the feedback control quantity, a signal amplitude output by a TIA and a direct current component of an offset T device, until an analog signal that enters the ADC is in a sampling range of the ADC, where the TIA is serially connected to the offset T device and then is connected to the ADC.

An embodiment of the present application provides a system for feedback control of a coherent receiver, where the system includes a DSP unit, an ADC, a TIA, and an offset T device. The DSP unit is configured to receive a digital signal converted by the ADC and obtain a feedback control quantity; and adjust, according to the feedback control quantity, a signal amplitude output by the TIA and a direct current component of the offset T device, until an analog signal input into the ADC is in a sampling range of the ADC, where the TIA is serially connected to the offset T device and then is connected to the ADC;

the offset T device is configured to receive a feedback control quantity from the DSP unit and output the adjusted direct current component of the offset T device, so as to adjust the analog signal that enters the ADC; and the TIA is configured to receive the feedback control quantity from the DSP unit and output the adjusted signal amplitude of the TIA, so as to adjust the analog signal that enters the ADC.

In the method, the apparatus, and the system for feedback control of the coherent receiver, a signal amplitude output by a TIA and a direct current component of an offset T device are adjusted according to an obtained feedback control quantity, so as to adjust an amplitude of an analog signal before ADC sampling and make the analog signal adapt to the ADC sampling best, maximize an effective information quantity sampled by an ADC and better support subsequent processing of a DSP unit, and thereby improve a coherent receiving performance.

DETAILED DESCRIPTION OF THE EMBODIMENTS

Technical solutions are described hereinafter in detail with reference to the accompanying drawings and the embodiments.

Figure 1:
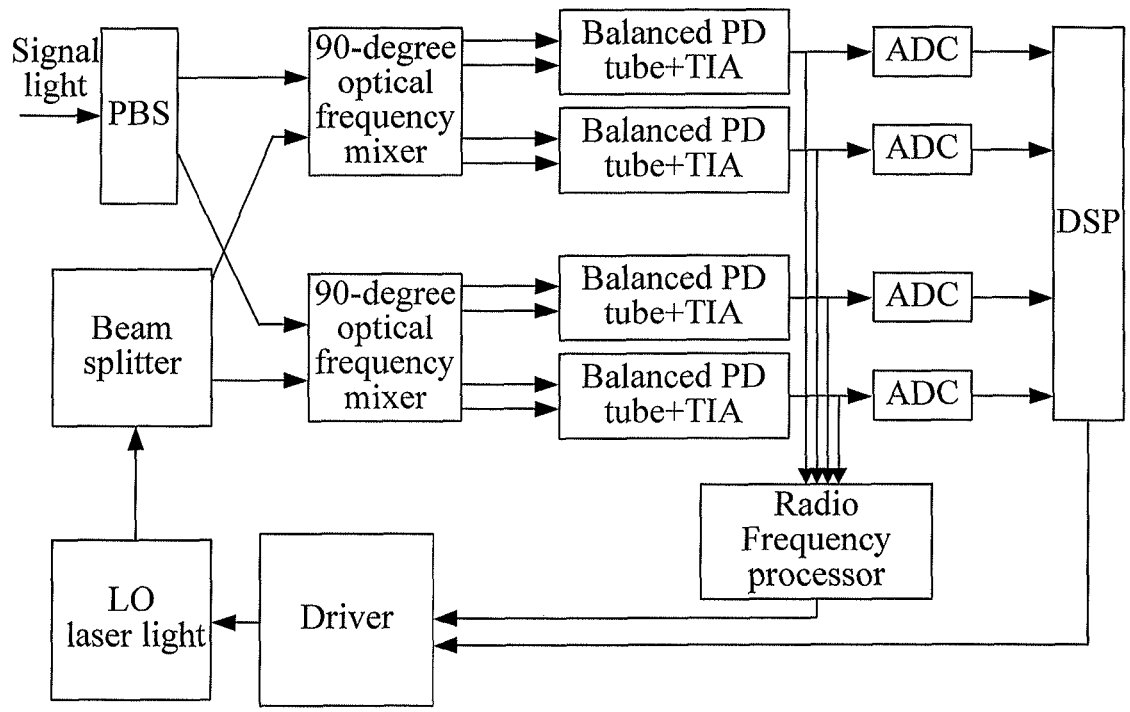
FIG. 1 is a schematic structural diagram of a model of a conventional coherent receiver.
Figure 2:
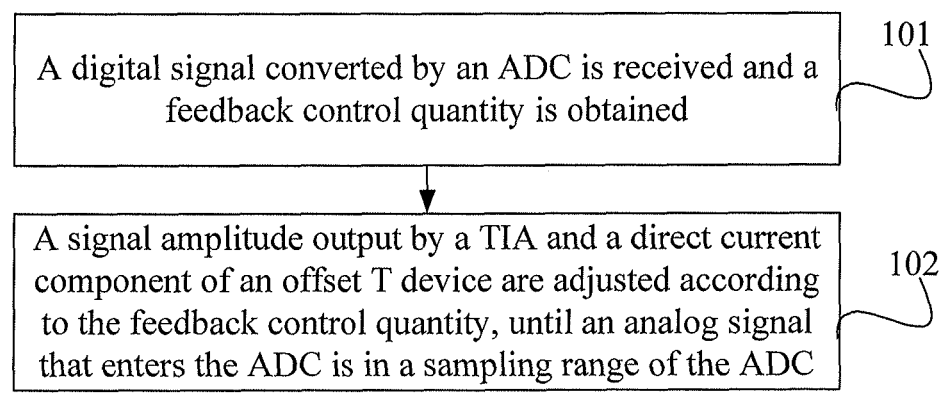
FIG. 2 is a flow chart of a first embodiment of a method for feedback control of a coherent receiver according to an embodiment.

FIG. 2 is a flow chart of a first embodiment of a method for feedback control of a coherent receiver according to the embodiment. As shown in FIG. 2, the method for feedback control of the coherent receiver includes the following.

In step 101, a digital signal converted by an ADC is received and a feedback control quantity is obtained.

A DSP unit obtains the feedback control quantity according to the received digital signal converted by the ADC. The feedback control quantity may be obtained in a plurality of manners, such as according to an error rate of the DSP unit and a special error function.

In step 102, a signal amplitude output by a TIA and a direct current component of an offset T device are adjusted according to the feedback control quantity, until an analog signal that enters the ADC is in a sampling range of the ADC.

According to the feedback control quantity, the DSP unit performs the processing and outputs two control signals. One control signal adjusts an output state of a local laser and/or a gain of the TIA, so that the signal amplitude output by the TIA stays within an amplitude range suitable for the ADC; the other control signal adjusts a Digital-to-Analog Converter (DAC) to control the direct current component of the offset T device, so that the analog signal before entering the ADC is offset to an optimal location in a quantized range of the ADC, that is, to adjust the offset location of the signal sampled at an front end of the ADC to be in a fixed sampling range of the ADC device.

As a key device in the electric processing of the coherent receiving, the ADC performs a digitalized conversion of the analog signal of the coherent receiving and provides the converted digital signal for the DSP unit. Therefore, the quality of the signal conversion has a direct influence on the entire receiver.

In the method for feedback control of the coherent receiver, the signal amplitude output by the TIA and the direct current component of the offset T device are adjusted according to the obtained feedback control quantity, so as to adjust the analog signal before the ADC sampling and enable the analog signal to adapt to the ADC sampling best, maximize the effective information quantity sampled by the ADC and better support the subsequent processing of the DSP unit, and thereby improve a coherent receiving performance. Further, during implementation, optical devices used on the optical path have a simple structure, and few special optical devices are required, so the implementation is easy.

Figure 3:
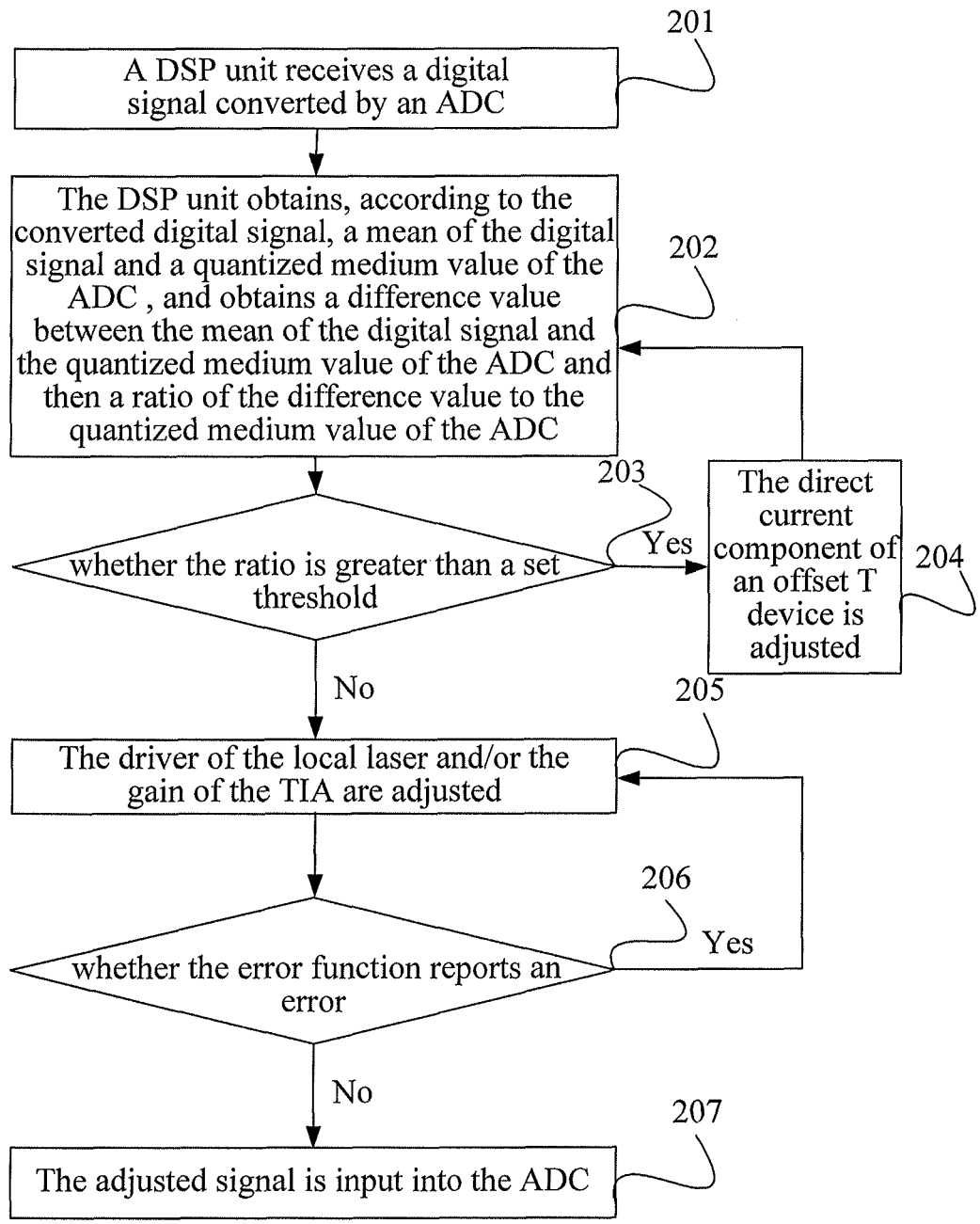
FIG. 3 is a flow chart of a second embodiment of the method for feedback control of the coherent receiver according to the embodiment.

FIG. 3 is a flow chart of a second embodiment of the method for feedback control of the coherent receiver according to the embodiment. The method includes the following.

In step 201, a DSP unit receives a digital signal converted by an ADC.

In step 202, the DSP unit obtains a mean of the digital signal and a quantized medium value of the ADC according to the converted digital signal, and obtains a difference value between the mean of the digital signal and the quantized medium value of the ADC and then obtains a ratio of the difference value to the quantized medium value of the ADC.

The quantized medium value of the ADC is a medium value of the sampling range of the ADC, that is, a value obtained by dividing the sampling range of the ADC by two.

In step 203, it is judged whether the ratio is greater than a set threshold, and if the ratio is greater than a set threshold, step 204 is performed; otherwise, step 205 is performed.

The set threshold may be set according to the performance of the receiver, and the threshold may be adjusted as required.

In step 204, the direct current component of the offset T device is adjusted, and step 202 is performed again.

If the ratio is greater than the set threshold, the direct current component of the offset T device is adjusted, so as to change the mean of the digital signal in step 202, and further to change the ratio; and if the ratio is still greater than the set threshold, the foregoing operations are repeated until the ratio is smaller than the set threshold.

In step 205, a driver of the local laser and/or the gain of the TIA are adjusted.

In step 206, it is judged whether the error function reports an error, and if the error function reports an error, step 205 is performed again; and if the error function does not report any error, step 207 is performed.

The error function is obtained according to the coherent electric processing algorithm and reflects the quality of the signal output by the TIA. Furthermore, the error function outputs information of control quantity related to the feedback control and has a function of error-reporting. If after the driver of the local laser and/or the gain of the TIA are adjusted, the signal output by the TIA has a bad quality, the error function reports an error and it is necessary to continue to adjust the driver of the local laser and/or the gain of the TIA until the error function stops reporting an error. An error function for feedback control is written in the coherent electric processing algorithm.

In step 207, the adjusted signal is input into the ADC.

The signal after the adjustments in steps 201 to 206 is the optimal signal within the sampling range of the ADC, that is, in the medium location of the sampling range of the ADC. The signal amplitude is in accordance with that of an optimal signal required by the ADC.

It should be specified that the judging steps 202 to 204 are in parallel with the judging steps 205 to 206, and they are not in a particularly fixed order.

In the method for feedback control of a coherent receiver, the ADC device samples the analog signal input from its front end, calculates the mean of the signal through the DSP unit, obtains the difference value by comparing the mean with the quantized medium value of the ADC, obtains a ratio by dividing the difference value by the quantized medium value of the ADC, and then compares the ratio with the set threshold. If the ratio is greater than the threshold, the direct current input component of the offset T device is adjusted until the ratio is smaller than the threshold. After the offset T device is adjusted, the driver of the laser is adjusted to increase the output power of the laser, or the parameters of the TIA are adjusted, so as to obtain an output level satisfying the sampled amplitudes at the output end of the TIA. The adjustment of the output level is processed according to a special error function of the DSP unit, and when the error function reports an error, it is necessary to continue to adjust the laser and/or the gain of the TIA, until no error report is prompted. At the time, the analog signal sampled by the ADC is the optimal signal.

In the method for feedback control of the coherent receiver, a variance between the signal output and the target output is detected, and the coupling ratio of the local laser lights and the signal lights are changed by adjusting the output power of the local laser and/or the gain of the TIA, so as to adjust the variance to be the optimum; the direct current component of the offset T device is adjusted to offset the RF signal, so that the analog signal before being input into the ADC is offset to the optimal location in the quantized range of the ADC, so as to maximize the effective information quantity sampled by the ADC, better support the subsequent processing of the DSP unit, and thereby improves the coherent receiving performance. Furthermore, the foregoing method does not require expensive optical devices and may be implemented by adding only several electric devices.

Figure 4:
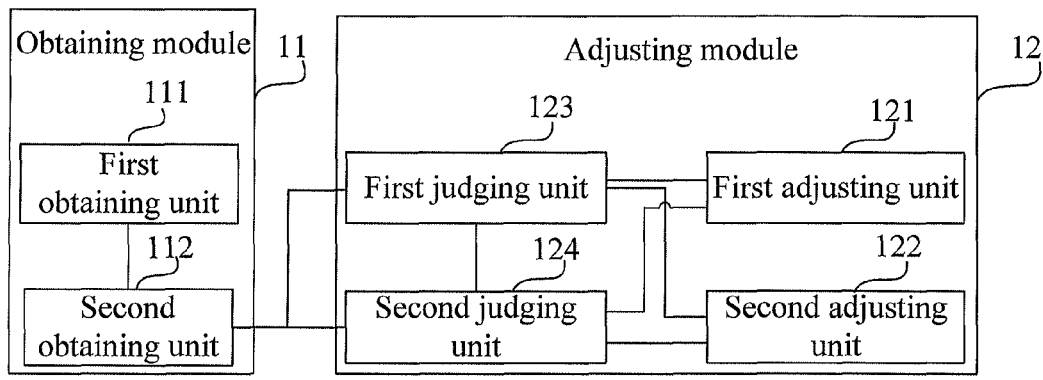
FIG. 4 is a schematic structural diagram of an embodiment of an apparatus for feedback control of a coherent receiver according to the embodiment.

FIG. 4 is a schematic structural diagram of an embodiment of an apparatus for feedback control of a coherent receiver according to the embodiment. The apparatus includes: an obtaining module 11, configured to receive a digital signal converted by an ADC and obtain a feedback control quantity, and an adjusting module 12, configured to adjust a signal amplitude output by a TIA and a direct current component of an offset T device according to the feedback control quantity, until an analog signal before entering the ADC is in a sampling range of the ADC.

In order to adjust the signal amplitude output by the TIA, the adjusting module 12 may include a first adjusting unit 121, configured to adjust an output power and a wavelength of a laser according to the feedback control quantity, and/or a second adjusting unit 122, configured to adjust a gain of the TIA according to the feedback control quantity.

In order to make the analog signal before being entering the ADC become the optimal signal, the obtaining module 11 may include: a first obtaining unit 111, configured to obtain a mean of the digital signal and a quantized medium value of the ADC, and a second obtaining unit 112, configured to obtain a difference value between the mean of the digital signal and the quantized medium value and obtain a ratio of the difference value to the quantized medium value; the adjusting module 12 may include: a first judging unit 123, configured to judge whether the ratio of the difference value to the quantized medium value is greater than a set threshold, and if the quantized medium value is greater than a set threshold, adjust the direct current component of the offset T device until the ratio of the difference value to the quantized medium value is smaller than the set threshold, and if the quantized medium value is not greater than a set threshold, invoke the first adjusting unit 121 to adjust the output power and the wavelength of the laser, and/or, invoke the second adjusting unit 122 to adjust the gain of the TIA; and a second judging unit 124, configured to judge whether an error function reports an error, and if the error function reports an error, invoke the first adjusting unit 121 to adjust the output power and the wavelength of the laser, and/or invoke the second adjusting unit 122 to adjust the gain of the TIA, and if the error function does not report an error, determine that the analog signal before entering the ADC is in the sampling range of the ADC.

The process, where the first obtaining unit, the second obtaining unit, the first judging unit, the second judging unit, the first adjusting unit, and the second adjusting unit obtain, through interaction to each other, the optimal analog signal that is in the sampling range of the ADC before entering the ADC, is the same as that of the embodiments of the method for feedback control of the coherent receiver according to the embodiment, for which details are not repeated herein again.

In addition, the feedback processing apparatus may be located in a DSP unit, and the DSP unit may be located in a programmable logic device or an Application Specific Integrated Circuit (ASIC) chip.

In the apparatus for feedback control of the coherent receiver, the adjusting module adjusts the signal amplitude and the direct current component of the offset T device according to the feedback control quantity obtained by the obtaining module, so as to adjust the analog signal before the ADC sampling and make the analog signal adapt to the ADC sampling best, maximize the effective information quantity sampled by the ADC and better support the subsequent processing of the DSP unit, and thereby improves the coherent receiving performance. Furthermore, during the implementation, few special optical devices are required, so the implementation is easy.

Figure 5:
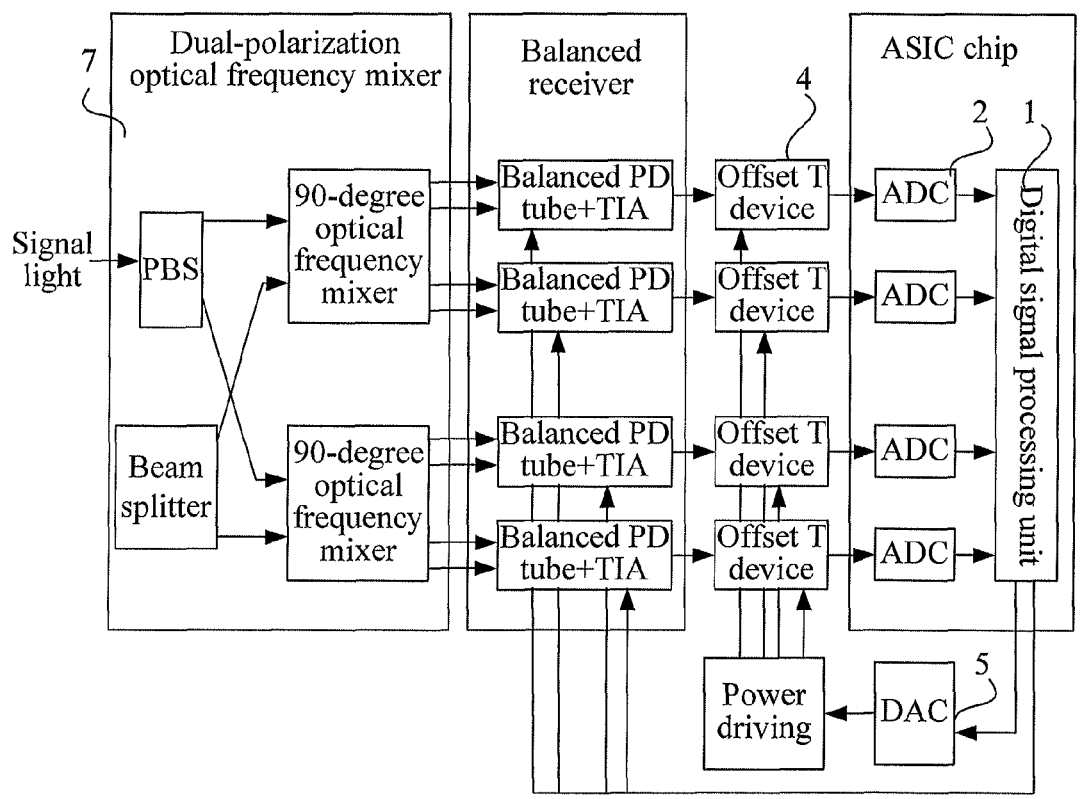
FIG. 5 is a schematic structural diagram of a first embodiment of a system for feedback control of a coherent receiver according to the embodiment.

FIG. 5 is a schematic structural diagram of a first embodiment of a system for feedback control of a coherent receiver according to the embodiment. The system includes a DSP unit 1, an ADC 2, a TIA, and an offset T device 4. The DSP unit 1 is configured to receive a digital signal converted by the ADC 2 and obtain a feedback control quantity; and configured to adjust a signal amplitude output by the TIA and a direct current component of the offset T device 4 according to the feedback control quantity, until an analog signal before entering the ADC 2 is in a sampling range of the ADC 2, where the TIA is serially connected to the offset T device 4 and then is connected to the ADC 2. The offset T device 4 is configured to receive the feedback control quantity from the DSP unit 1 and output the adjusted direct current component of the offset T device 4, so as to adjust the analog signal input into the ADC 2. The TIA is configured to receive the feedback control quantity from the DSP unit 1 and output the adjusted signal amplitude of the TIA, so as to adjust the analog signal that enters the ADC.

For the system shown in FIG. 5, the signal amplitude output by the TIA may be adjusted by adjusting the TIA, where the adjusting the TIA is specifically implemented by adjusting a gain of the TIA.

In addition, the system may further include a laser 3, configured to receive the feedback control quantity from the DSP unit 1, and output a power and a wavelength of its own, and a dual-polarization optical frequency mixer 7, configured to forward the power and wavelength output by the laser 3 to the TIA, so as to adjust the analog signal that enters the ADC 2. The specific structure of the system is as shown in FIG. 6.

Figure 6:
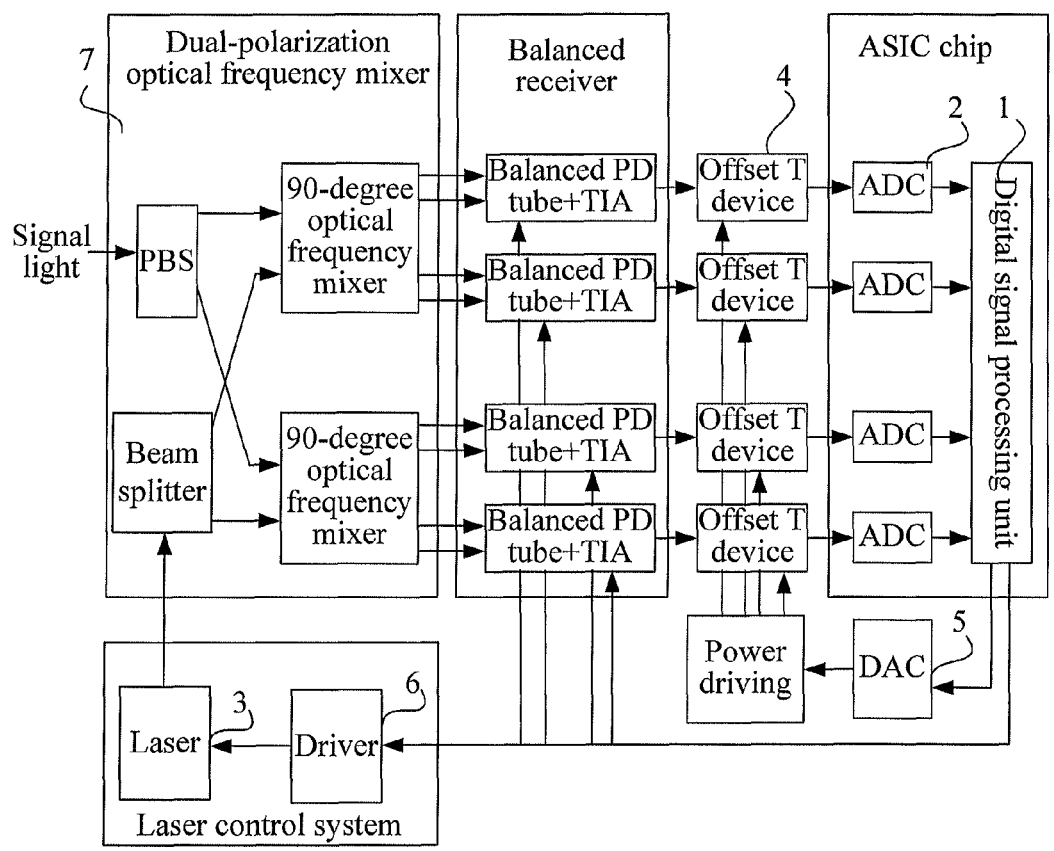
FIG. 6 is a schematic structural diagram of a second embodiment of the system for feedback control of the coherent receiver according to the embodiment.

For the system shown in the FIG. 6, the output signal of the TIA may be adjusted by adjusting the laser and may also be adjusted by adjusting the laser and the TIA, where the adjusting the TIA is specifically implemented by adjusting the gain of the TIA. In order to offset the sampled analog signal by using a direct current level, that is, to increase or decrease the sampled analog signal, the system for feedback control of the coherent receiver may further include a DAC 5, configured to receive the feedback control quantity from the DSP unit 1, set an output level value according to the feedback control quantity, and add the output level value to a direct current pin of the offset T device 4 in a power driving manner.

The DSP unit and the ADC are integrated and fixed in an ASIC chip, the laser 3 is located in a laser control system, and the TIA is located in a balanced receiver. Meanwhile, the laser control apparatus further includes a driver 6, configured to receive the feedback control quantity from the DSP unit 1 and drive, according to the feedback control quantity, the laser 3 to adjust the output power and the wavelength.

In addition, the ASIC chip controls the DAC and the driver of the laser through a control port, where the control port may be a control bus satisfying a relevant protocol, such as an Inter-Integrated Circuit (I2C), a serial peripheral interface (SPI), and a serial data bus (RS232). After an optimal output power value and an optimal wavelength value of the laser are obtained through the calculation of the DSP, the laser control system responds to the feedback instruction by changing an internal relevant circuit and finally makes the amplitude of the signal sampled at the front end of the ADC be at an optimal amplitude. Meanwhile, the sampled signal at the front end of the ADC may also be adjusted directly by controlling the gain of the TIA in the balanced receiver. The offset T device or similar apparatuses serve to add a direct current component to Alternating Current information, so as to offset the RF signal.

It can be known that the system does not require any expensive optical devices and can be easily implemented by adding only several electric devices; through an adaptive adjusting procedure, the system enables the signal before entering the ADC to achieve the optimal offset voltage and amplitude range of the ADC, so as to improve the performance of the coherent receiving system.

In the system for feedback control of the coherent receiver, the DSP unit adjusts, according to the obtained feedback control quantity, the signal amplitude output by the TIA and the direct current component of the offset T device, so as to adjust the analog signal before the ADC sampling and enable the analog signal to adapt to the ADC sampling best, maximize the effective information quantity sampled by the ADC and support the subsequent processing of the DSP unit best, and thereby improve the coherent receiving performance. Further, during the implementation, several electric devices are added to the system, and only few special optical devices are required, so the implementation is easy.

Finally, it should be noted that the disclosed embodiments are only used to describe the technical solutions and are not intended to limit the present invention. Many modifications and/or equivalent substitutions to the embodiments may be made without departing from the spirit and scope of the claims.

What is claimed is:

1. A method for feedback control of a coherent receiver, comprising:
    obtaining a feedback control quantity according to a digital signal converted by an Analog-to-Digital Converter (ADC); and
    adjusting, according to the feedback control quantity, a signal amplitude output by a Transimpedance Amplifier (TIA) and a direct current component of an offset T device, until an analog signal that enters the ADC is in a sampling range of the ADC, wherein the TIA is serially connected to the offset T device and then is connected to the ADC.

2. The method for feedback control of a coherent receiver according to claim 1, wherein the adjusting, according to the feedback control quantity, the signal amplitude output by the TIA, comprises:
    adjusting an output power and a wavelength of a laser according to the feedback control quantity; and
    adjusting a gain of the TIA according to the feedback control quantity.

3. The method for feedback control of a coherent receiver according to claim 1, wherein the obtaining the feedback control quantity comprises:
    obtaining a mean value of the digital signal and a quantized medium value of the ADC; and
    obtaining a difference value according to the mean value of the digital signal and the quantized medium value, and a ratio of the difference value to the quantized medium value.

4. The method for feedback control of a coherent receiver according to claim 3, wherein the adjusting according to the feedback control quantity, the signal amplitude output by the TIA and the direct current component of the offset T device, until the analog signal that enters the ADC is in the sampling range of the ADC comprises:
    determining whether the ratio of the difference value to the quantized medium value is greater than a set threshold;
    if the ratio is greater than the set threshold, adjusting the direct current component of the offset T device, until the ratio of the difference value to the quantized medium value is smaller than the set threshold;
    if the ratio is not greater than the set threshold, adjusting an output power and a wavelength of a laser, and/or adjusting a gain of the TIA;
    determining whether an error function reports an error;
    if the error function reports an error, adjusting the output power and the wavelength of the laser, and adjusting the gain of the TIA; and
    if the error function does not report any error, determining that the analog signal before entering the ADC is in the sampling range of the ADC.

5. An apparatus for feedback control of a coherent receiver, comprising:
    an obtaining module configured to obtain a feedback control quantity according to a received digital signal converted by an Analog-to-Digital Converter (ADC); and
    an adjusting module configured to adjust a signal amplitude output by a Transimpedance Amplifier (TIA) and a direct current component of an offset T device according to the feedback control quantity until an analog signal that enters the ADC is in a sampling range of the ADC, wherein the TIA is serially connected to the offset T device and then is connected to the ADC.

6. The apparatus for feedback control of a coherent receiver according to claim 5, wherein the adjusting module comprises:
a first adjusting unit configured to adjust an output power and a wavelength of a laser according to the feedback control quantity; and
a second adjusting unit configured to adjust a gain of the TIA according to the feedback control quantity.

7. The apparatus for feedback control of a coherent receiver according to claim 5, wherein the obtaining module comprises:
a first obtaining unit configured to obtain a mean value of the digital signal and a quantized medium value of the ADC; and
a second obtaining unit configured to obtain a difference value between the mean value of the digital signal and the quantized medium value, and a ratio of the difference value to the quantized medium value.

8. The apparatus for feedback control of a coherent receiver according to claim 7, wherein the adjusting module comprises:
a first determining unit configured to determine whether the ratio of the difference value to the quantized medium value is greater than a set threshold, and if the ratio is greater than the set threshold, adjust the direct current component of the offset T device until the ratio of the difference value to the quantized medium value is smaller than the set threshold; and if the ratio is not greater than the set threshold, invoke a first adjusting unit to adjust an output power and a wavelength of a laser and invoke a second adjusting unit to adjust a gain of the TIA; and
a second determining unit, configured to determine whether an error function reports an error, and if the error function reports an error, invoke the first adjusting unit to adjust the output power and the wavelength of the laser and invoke the second adjusting unit to adjust the gain of the TIA; and if the error function does not report any error, determine that the analog signal before entering the ADC is in the sampling range of the ADC.

9. The apparatus for feedback control of a coherent receiver according to claim 5, wherein the apparatus for feedback control of a coherent receiver is located in a Digital Signal Processing (DSP) unit, and the DSP unit is located in a programmable logic device or an Application Specific Integrated Circuit (ASIC) chip.

10. A system for feedback control of a coherent receiver, comprising:
a Digital Signal Processing (DSP) unit, an Analog-to-Digital Converter (ADC), a Transimpedance Amplifier (TIA), and an offset T device, wherein
the DSP unit is configured to receive a digital signal converted by the ADC and obtain a feedback control quantity; and adjust, according to the feedback control quantity, a signal amplitude output by the TIA and a direct current component of the offset T device, until an analog signal that enters the ADC is in a sampling range of the ADC, wherein the TIA is serially connected to the offset T device and then is connected to the ADC;
the offset T device is configured to receive the feedback control quantity from the DSP unit and output the adjusted direct current component of the offset T device, so as to adjust the analog signal that enters the ADC; and
the TIA is configured to receive the feedback control quantity from the DSP unit and output the adjusted signal amplitude of the TIA, so as to adjust the analog signal input into the ADC.

11. The system for feedback control of a coherent receiver according to claim 10, further comprising:
a laser configured to receive the feedback control quantity from the DSP unit, and output a power and a wavelength of its own; and
a dual-polarization optical frequency mixer configured to forward the power and the wavelength of the laser to the TIA, so as to adjust the analog signal that enters the ADC.

12. The system for feedback control of a coherent receiver according to claim 10, further comprising:
a Digital-to-Analog Converter (DAC) configured to receive the feedback control quantity from the DSP unit, set an output level value according to the feedback control quantity, and add the output level value to a direct current pin of the offset T device in a power driving manner.

13. The system for feedback control of a coherent receiver according to claim 12, wherein the DSP unit and the ADC are integrated in an Application Specific Integrated Circuit (ASIC) chip, the laser is located in a laser control system, and the TIA is located in a balanced receiver.

14. The system for feedback control of a coherent receiver according to claim 13, wherein the laser control system further comprises:
a driver configured to receive the feedback control quantity from the DSP unit, and drive, according to the feedback control quantity, the laser to adjust the output power and the wavelength.

* * * * *